Figure 1:
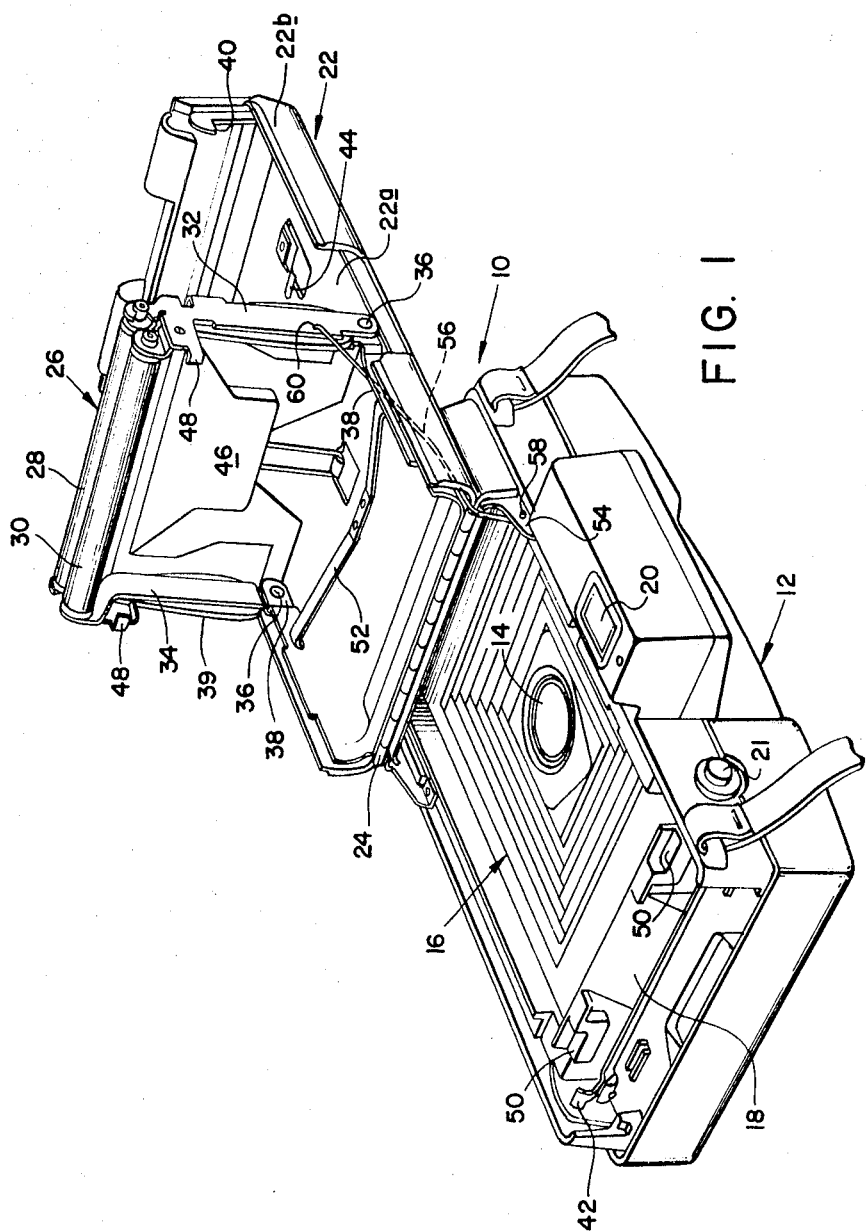

United States Patent

[11] 3,590,707

| | | |
|---|---|---|
| [72] | Inventor | David S. Merz<br>Belmont, Mass. |
| [21] | Appl No | 14,740 |
| [22] | Filed | Feb. 24, 1970 |
| [45] | Patented | July 6, 1971 |
| [73] | Assignee | Polaroid Corporation<br>Cambridge, Mass.<br>Continuation of application Ser. No.<br>754,217, Aug. 21, 1968. |

[54] SELF-ERECTING COMPRESSIVE MEMBERS IN A CAMERA
18 Claims, 2 Drawing Figs.

[52] U.S. Cl. .................................................. 95/13
[51] Int. Cl. ........................................... G03b 17/50
[50] Field of Search .......................................... 95/11, 13

[56] References Cited
UNITED STATES PATENTS
3,283,682   7/1964   Rice .................... 95/13

*Primary Examiner*—John M. Horan
*Assistant Examiner*—Alan Mathews

ABSTRACT: Apparatus automatically elevating and making accessible the normally shielded compressive members of a self-developing camera. The compressive members are carried by supporting arms having pivotal connection with the inner portion of the cover. Upon opening the cover, the compressive members are raised for the purpose of routine inspection and remedying any operational defect.

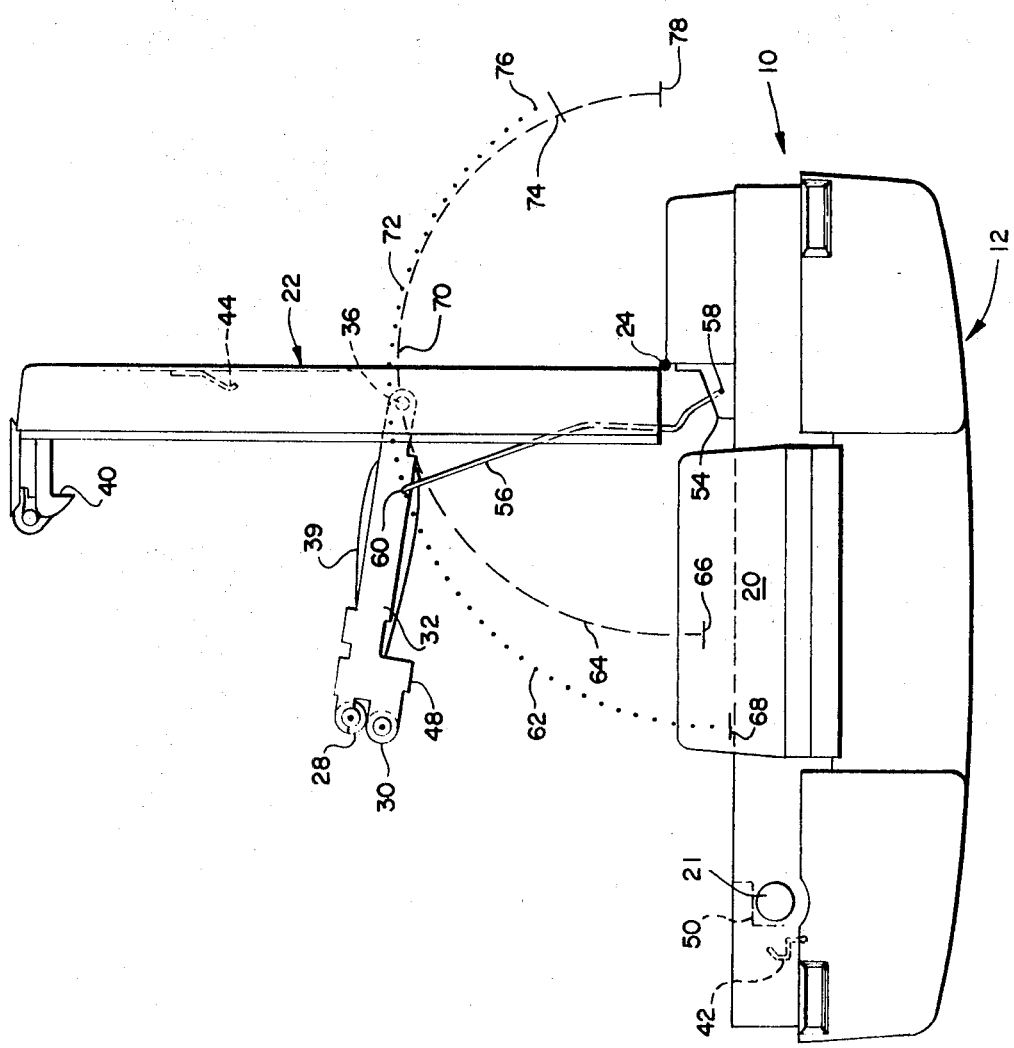

SELF-ERECTING COMPRESSIVE MEMBERS IN A CAMERA

This is a continuation of application Ser. No. 754,217, filed Aug. 21, 1968.

The subject invention relates to cameras of the type adapted to accommodate so-called "self-developing" film assemblages or units in the form of a film pack, each film assemblages or units in the form of a pack, each film unit releasably carrying a given quantity of a liquid processing composition. In such a camera, following their photographic exposure, the film units are compressed by suitable compressive members between which each is advanced to release to exposed photosensitive and other portions the liquid processing composition. Immediately after distribution of the liquid throughout the intended film areas, a finished photographic print is produced by diffusion transfer, either in black and white or in full color. Cameras capable of providing these operations are of the type sold by Polaroid Corporation, Cambridge, Mass., U.S.A.

The liquid processing composition carried in a frangible container integral with the film unit may, inadvertently, escape therefrom as, for example, during a faulty performance of the processing operation. As a result, the functional surfaces of the compressive members may become fouled or they may be accidentally soiled due to some other cause. In either event, it is essential that these surfaces shall be maintained free from a deposit of foreign matter and in a completely clean condition. Where the surfaces have mistakenly received some of the processing liquid, it may not easily be discovered because of its transparency. A check of the surfaces by running a finger along the same to note the possible presence of a wet or hardened deposited of the liquid may therefore be required.

Apparatus of the nature contemplated herein is especially adapted to cameras of the foregoing description which employ film packs. Such film packs contain a given supply of individual film units each of which, in addition to the contained liquid, includes a pair of tabs adapted to project from an aperture of the camera. The tabs are manually drawn upon in sequence to advance the unit between compressive means and effect the processing step. The camera back includes a hinged cover and a pair of comprehensive members mounted at the extremities of, that is transversely between the ends of, two elongated arms, the latter being pivotally attached to inner surfaces of the cover.

Heretofore, in a camera of the character described, a pivotal assembly of the compressive members had been located and held by latching means substantially flat against the principal inner cover surface so as to be partially enclosed thereby and by sidewall portions of the cover. This had been the condition excepting when t he latching means was released and the assembly pivoted outwardly as a special manual operation. Accordingly, the surfaces of the compressive members had largely been obscured during opening of the cover to load the film pack and their condition had been overlooked or unchecked. The present invention automatically brings the compressive members into an erect position, in spaced relation to the cover, whenever the latter is opened. Thus the operator cannot fail to be reminded of the need to ascertain their condition when inserting each film pack. Accordingly, it is possible to correct in advance for any condition of the compressive members which would interfere with satisfactory processing.

In view of the foregoing considerations, objects of the invention are to provide, in a camera of the type set forth, apparatus for automatically bringing compressive processing members to an erect position for inspection purposes whenever access means to the film-holding chamber such as a pivotal cover is opened; to provide apparatus of the character described which is adapted to elevate an assembly comprising said compressive processing members to a position which projects at approximately 90° with respect to the pivotal cover upon which the assembly is mounted; and to provide apparatus as characterized which is of a simple and inexpensive structure and positive in operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of this invention, reference should be had to the following taken in connection with the accompanying drawings wherein:

FIG. 1 is a diagrammatic perspective view of a camera embodying apparatus of the invention; and FIG. 2 is a side elevation view illustrating diagrammatically the operation of the apparatus.

Referring now to the drawings, a camera 10 of the type above-described for producing a finished photographic print immediately following an exposure and incorportating apparatus of the invention is illustrated. The principal structure or body 12 of the camera includes, in brief, a lens 14, an exposure chamber 16 within which a film pack (not shown) may be mounted, an aperture 18 through which tab elements of the film pack are adapted to protrude for processing purposes, a finder 20, a shutter release button 21 and a pivotal cover 22 attached to the camera body 12 by a hinge 24. A compressive means or assemblage 26 comprising two pressure rolls 28 and 30 is mounted for rotation on a pair of supporting arms 32 and 34. The arms, in turn, are mounted for rotation by pivots 36 passing, respectively, through apertures formed in the arms and in cover portions 38. The pressure rolls 28 and 30 are relatively translationally movable and are biased toward one another by a pair of "U" springs 39 associated with the mounting arms.

The cover 22, when pivoted to closed position, is held thereat by latch means 40 of the cover in engagement with complementary releasable latch means 42 of the camera body. At closed position of the cover 22, the compressive assemblage 26 is positioned, by means and in a manner to be described below, adjacent to the rear or base portion 22a thereof. At this position, two laterally positioned, outwardly projecting flat springs 44 (one shown) extending from cover portion 22a are adapted to bear against an intermediate platelike structure 46 of the compressive assemblage, namely, against the surface opposite to that shown. Assuming the cover to be closed, with the portion 46 of the compressive means 26 in contact with the springs 44, as above-described, a pair of ears or tabs 48 for positioning the compressive members 28 and 30 correctly with respect to the aperture 18 of the camera body are brought into contact with limit stop means in the form of the two platforms 50, the springs 44 providing the necessary biasing and holding force. The film pack is held firmly mounted in chamber 16 by the "Y" spring 52.

As previously intimated, in a conventional camera of the type described, the compressive assemblage is hold flat against the cover by an independently operable latch irrespective of whether the cover is at closed or open position. This latch must be manually released and the compressive assemblage grasped and pivoted to the position shown in FIG. 1 if it is desired to inspect and clean the pressure rolls 28 and 30. Thus the pressure rolls are normally positioned within recessed and concealing portions of the cover provided by the base and sidewall portions 22a and 22b and their condition may be overlooked when the cover is opened to load a film pack in the camera. Accordingly, the entire film pack may be improperly processed with streaks, gaps or other imperfections appearing in the image.

Apparatus of the subject invention practically avoids this possibility by dispensing with the conventional latch which holds the compressive assemblage within enclosing portions of the cover and by bringing the compressive members into full view through a self-erecting or elevating mechanism which operates automatically whenever the cover is opened. The apparatus comprises a bracket 54 formed, for example, of a rigid metal and fixed to the camera body at one side of the exposure chamber 16 and adjacent to the hinge 24, the configurated metallic link 56, and the pivotal connections 58 and 60 of the link to the bracket and supporting arm 32, respectively, in combination with the cover 22, the hinge 24, the supporting arm 32 per se, and the pivotal means 36 connecting the latter to the cover structure. In an extended sense, the apparatus is also to be considered in its cooperating relation with the latching, biasing and limit stop means of the cover above-described with respect to providing a correct positioning or seating of the compressive assemblage when the cover is at closed position.

As shown in FIG. 1, the link 56 is nonlinear in shape, generally resembling the letter "S," which permits it to bypass portions of the camera and hinge when the cover approaches a fully open position. The link is composed of a suitable metal such as a stainless steel and while predominantly rigid it possesses, advantageously, a slight resiliency permitting an unhampered functional positioning of the compressive means when the cover is at closed position. The link is pivotally connected with the bracket 54 and supporting arm 32 at 58 and 60, respectively, overturned extremities of the link being inserted in perforations formed in the elements 54 and 32 for the purpose.

It is to be noted that pivot point 58 of the link is laterally offset with respect to the pivot point 24, namely, that of the hinge element. It is further to be observed that the pivot points 24 and 58 are relatively vertically displaced. The length of the link 56, considered in a straight line, is thus greater than that of the cover between its hinge 24 and a plane passing through the pivot 36 normal to that of the cover. Accordingly, an arc 62 described by the extremity of the link at point 60 during rotation of the link is both broader than an arc 64 described by pivot 36 of the cover when the latter is rotated and is offset or displaced relative thereto in a given direction, that is, to the left as shown. This combination of factors provides that the two arcs are predeterminately spaced apart at a closed condition of the cover indicated at locations 66 of the pivot 36 and 68 of the link extremity 60; that they converge between the aforesaid positions 66 and 68 and new positions 70 and 72; and that they are substantially superimposed between positions 70 and 72 and new positions 74 and 76. It will be noted that the cover proceeds to the position indicated at 78 and has traversed approximately 180° while the link has traversed a lesser arc and is located at approximately 45° to the plane of the cover. Accordingly the effective or relative length of the link varies during the aforesaid arcual movements so as to force the compressive assembly into the cover when the latter is approaching a closed position and to draw the compressive assembly out of the cover during opening of the latter. The comprehensive assembly is held substantially at a 90° relation to the cover from the point of substantially complete convergence or initial superimposition of the two arcs shown in FIG. 2 to the position of complete opening of the cover shown in FIG. 1.

The bracket 54 and supporting arm lie in a plane extending from the camera body into the cover, the link being positioned approximately in this plane also within a recess or channel formed by portions 22b and 38 of the cover. During the procedure of opening the cover from a closed position to the 90° relation shown in FIG. 2, the link rotates approximately 75°. During an additional 90° rotation of the cover to the position shown in FIG. 1, the link rotates through approximately 90°, as well.

By way of example, employing a camera of the so-called "300" series, manufactured by Polaroid Corporation, above-referenced, the lateral offset of pivot point 58 relative to hinge 24 is one-quarter inch and the vertical offset of point 58 relative to the hinge is one-half inch. The distance between hinge 24 and the aforementioned plane passing through pivot point 36 is 2½ inches. The distances between pivot point 36 and pivot point 60 is three-quarters of an inch. The effective or straight line length of the link 56 is 3⅛ inches.

Certain modifications of the apparatus will be apparent. The compressive members 28 and 30 may be of a nonrotatable, fixed gap or some other type. A pair of the links 56 may be employed for attachment to both of the supporting arms 32 and 34 if desired.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. Photographic apparatus for use with at least one self-developing film unit including at least one sheet of photographic material, said apparatus comprising:

a housing member having an opening;

a closure member adapted to cooperate with said housing member to enclose such film unit adjacent said opening and to subsequently be displaced with respect to said housing member to facilitate the removal of such film unit from said apparatus;

means for processing such film unit including at least one pressure applying instrumentality for applying processing fluid onto such sheet of photographic material, said processing means being displaceably mounted upon one of said members and adapted to be displaced between a first position, wherein said pressure applying instrumentality is in operative relationship to such film unit and located in close proximity to said member to which it is mounted and thereby substantially inaccessible for cleaning and visual inspection, and a second position wherein said pressure applying instrumentality is disposed out of close proximity to said member to which it is mounted and thereby readily accessible for cleaning and visual inspection; and means for automatically displacing said processing means from its said first position to its said second position during such displacement of said closure member and for facilitating the automatic return of said processing means to its said first position whenever said closure member is returned to its position wherein such film unit is enclosed by said housing member and said closure member.

2. The apparatus of claim 1 wherein said processing means are mounted on at least one supporting arm pivotally connected to one of said members and said displacing means includes a link having its opposite ends pivotally connected to said one member and said supporting arm, respectively.

3. The apparatus of claim 2 wherein said link is of a length and shape and connected to said one member and to said supporting arm in a manner to locate said supporting arm adjacent said one member when said members are disposed in their film unit enclosing positions and to effect substantially a 90° pivotal movement of said supporting arm when said closure member is moved to its fully opened position with respect to said housing member.

4. The apparatus of claim 2 wherein a hinge is employed to connect said closure member to said housing member and the radial distance between said hinge and the approximate point of attachment of said supporting arm and said one member is less than the radial distance between the point of attachment of said link and the other said member and the point of attachment of said link and said supporting arm.

5. The apparatus of claim 2 wherein a hinge is employed to connect said closure member to said housing member and wherein said hinge and the connection between said link and said one member are relatively laterally offset by a given amount providing different paths of arcular movement of said other member and said link.

6. The apparatus of claim 2 wherein said link is of a predetermined resiliency adapted to provide a slight freedom of pivotal movement of said processing means when said members are in their film unit enclosing positions.

7. In a camera of a type for accommodating a film pack composed of a plurality of so-called self-developing film units for producing finished photographic prints immediately following their exposure including a cover having, respectively, rear and sidewall portions, a transverse hinge at one end connecting with a rear body portion of the camera and latching means therefor, and compressive means adapted to process said film units including a pair of pressure-applying members carried by supporting arms having pivotal connection with inner portions of the cover approximately midway of its length and normally lying within and substantially contiguous with said rear and sidewall portions of the cover in a generally shielded condition, apparatus cooperating with said cover, hinge, supporting arms and pivotal connection for automatically raising said compressive means from their shielded location at a closed condition of the cover to render them substantially fully visible and provide complete access to said pressure-appplying members for inspection purposes upon opening said cover, as for example during each loading of a film pack, said apparatus comprising a bracket integral with said camera body at one side of an internal exposure chamber of the latter and predeterminately adjacent to a given transverse extremity of said hinge, a link member of a given length and means pivotally connecting the opposite ends of said link member, respectively, to predetermined portions of said bracket and to one of said pivotal supporting arms of the compressive means.

8. Apparatus, as defined in claim 7, wherein said link is of a nonlinear shape.

9. Apparatus, as defined in claim 8, wherein said link is in the form of a modified "S."

10. Apparatus, as defined in claim 7, wherein said bracket and said one supporting arm lie substantially in a plane which extends from said camera body to a location within and adjacent to a sidewall portion of said cover.

11. Apparatus, as defined in claim 7, wherein the radial distance between said hinge and the approximate point of attachment of said supporting arm and cover is less than the radial distance between the point of attachment of said link and bracket and the point of attachment of said link and supporting arm.

12. Apparatus, as defined in claim 7, wherein said hinge and said means pivotally connecting said link member to said bracket are relatively laterally offset by a given amount providing different paths of arcual movement of said cover and said link.

13. Apparatus, as defined in claim 12, wherein said hinge and said means pivotally connecting said link member to said bracket are relatively vertically offset by a given amount.

14. Apparatus, as defined in claim 12, wherein the length and configuration of said link and the locations of its points of attachment to said bracket and supporting arm are so chosen that during pivotal movement of the cover and supporting arm, the arcual paths described by the point of pivotal connection of said supporting arm to said cover and the point of pivotal connection of said link to said supporting arm proceed convergently during movement of the cover from a spaced condition of said arcual paths at a closed condition of said cover to a substantially superimposed condition during movement of the cover from an approximately 90° open position to one of 180°.

15. Apparatus, as defined in claim 14, wherein the nonlinear shape of said link is of a configuration adapted to permit its clearance of portions of said camera and cover which protrude into a straight line path between the points of pivotal connection of the link to said bracket and supporting arm at open positions of the cover thereby to permit a given substantially constant angular relation between said mounting arm and said cover during said movement of the latter from an approximately 90° open position to one of 180°.

16. Apparatus, as defined in claim 14, wherein during rotation of said cover from a closed position through approximately 90° said link rotates approximately 75° and wherein during rotation of said cover from 90° to approximately 180° said link rotates approximately 90°.

17. Apparatus, as defined in claim 7, wherein said link member is composed of a metal and is of a predetermined resiliency adapted to provide a slight freedom of pivotal movement of said compressive means within shielding portions of the cover at a closed position of the latter.

18. Apparatus, as defined in claim 7, wherein said means pivotally connecting the ends of said link member comprise perforations formed, respectively, in said bracket and said supporting arm and right-angled extremities of said link member inserted therein.